(No Model.)
S. ELLIOTT.
BALL BEARING.
No. 491,938. Patented Feb. 14, 1893.
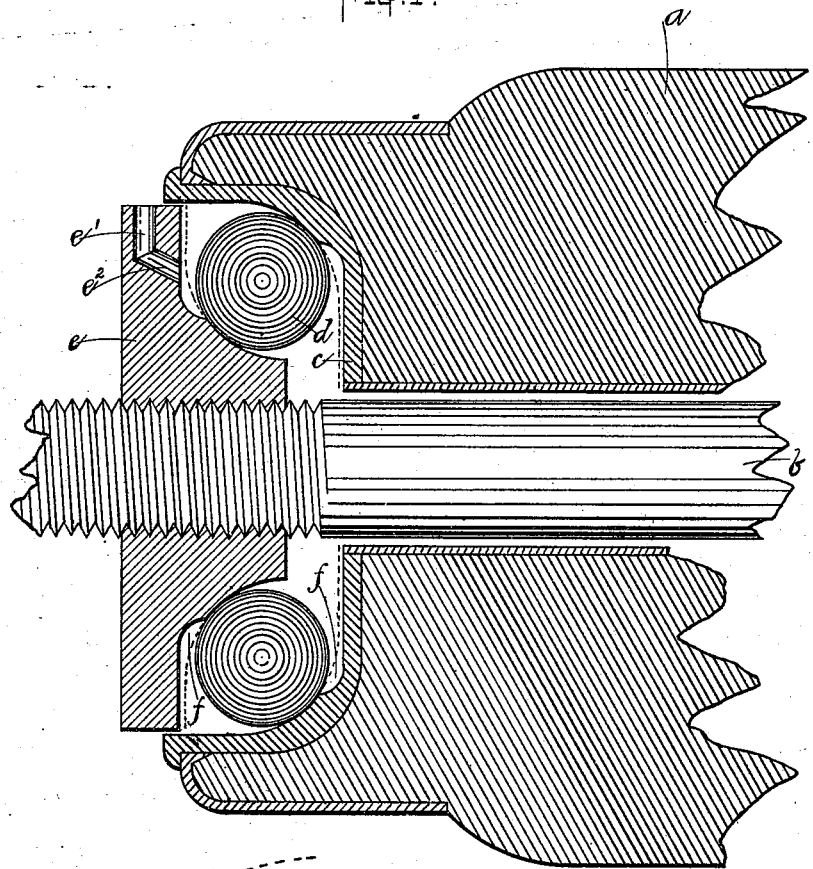
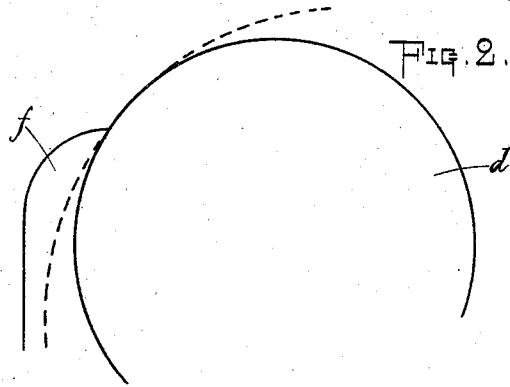
WITNESSES:
James L. Crandall
Lucy F. Graves
INVENTOR
Sterling Elliott,
BY
B. J. Noyes
ATTORNEY.

UNITED STATES PATENT OFFICE.

STERLING ELLIOTT, OF NEWTON, ASSIGNOR TO THE HICKORY WHEEL COMPANY, OF WATERTOWN, MASSACHUSETTS.

BALL-BEARING.

SPECIFICATION forming part of Letters Patent No. 491,938, dated February 14, 1893.

Application filed June 15, 1892. Serial No. 436,757. (No model.)

*To all whom it may concern:*

Be it known that I, STERLING ELLIOTT, of Newton, county of Middlesex, State of Massachusetts, have invented an Improvement in Ball-Bearings, of which the following description, in connection with the accompanying drawings, is a specification, like letters on the drawings representing like parts.

This invention relates to ball bearings for wheels and the like, and has for its object to so construct the same that the bearing surfaces for the balls or that portion thereof in contact with which the balls lie, will not be increased in area by wear, as is the case with the bearings now in common use.

In accordance with this invention the bearings for the balls are made in two parts, one of which is adjustable with relation to the other, each part having an annular bearing surface with a face curved eccentric to the curvatures, or contour of the balls, that the balls may contact therewith only for a short distance, said bearing surfaces being cut away or reduced in width at one side thereof, beginning at a point where the balls cease to contact therewith, so that no material is present beyond such point of contact into which a seat or cavity may be worn by the balls, and thereby increase the extent or area of the contacting surface.

Figure 1, shows in longitudinal vertical section, a portion of the hub of the wheel provided with ball bearings embodying this invention, and Fig. 2, a diagram to be referred to.

The hub $a$, and axle $b$, are of any well known or suitable construction. The bearings for the balls $d$, are composed of two parts $c$, $e$, one of which as $c$, is seated in a socket in the end of the hub, and the other of which as $e$, is screwed on to the end of the axle $b$, on which said hub turns, so that the part $e$, is therefore made adjustable with relation to the part $c$. The parts $c$, $e$, have formed upon their faces annular bearing surfaces for the balls $d$, the faces of which, against which said balls bear being curved transversely eccentric to the curvatures of the balls, in order that said balls may contact therewith but for short distances only, thereby reducing the friction to the minimum. Heretofore the curves given to the said faces have been extended continuously or uninterrupted, as represented by the dotted lines, and when so formed seats or cavities are formed or worn in said bearing surfaces by the balls, which as they form tend to gradually increase the surface area or portion with which said balls contact, thereby increasing the friction, and also changing the location of said bearing surfaces so that the pressure on the balls is not brought at a proper angle as compared with the direction of the load. I have herein cut away said annular bearing surfaces as at $f$, the one on the part $c$, being cut away on the inside, and the one on the part $e$, being cut away on the outside, presenting a clearance or space at opposite sides of the balls, beginning at points where said balls cease to contact with said curved faces, so that as said bearing surfaces or portions thereof with which the said balls contact are worn away no material is present to increase the extent or surface area of said contacting portion, so that the friction will not be increased. As the bearing surfaces are worn away, the end piece or part $e$, will be turned on the axle to compensate for said wear, and one or more spanner holes as $e'$, are provided which receive a suitable spanner for the purpose of turning said part $e$.

I have herein provided the part $e$, with passages $e^2$, leading from the spanner holes $e'$, so that a continuous passage is provided communicating directly with the ball-receiving chamber, which affords an opportunity for supplying said chamber directly with oil.

While I have herein shown my invention as applied to a wheel with a wooden hub, I do not desire to limit its use to any particular form or construction of wheel.

I claim—

1. The hub, axle, and balls, combined with bearings for said balls, composed of two parts, one of which is adjustable with relation to the other, each part having a curved bearing surface with each of which said balls contact at one point only, both of said annular bearing surfaces being cut away as at $f$, beginning at points where said balls cease to contact with said surfaces, as and for the purposes set forth.

2. The hub, axle and balls, combined with bearings for said balls, composed of two parts, one of which is adjustable with relation to the other, each part having an annular bearing surface curved transversely eccentric to the curvatures of the balls, that each of said balls may contact therewith only at one point, said annular bearing surfaces being cut away as at *f*, one at the outer, and the other at the inner side thereof, beginning at points where said balls cease to contact with said surfaces, as and for the purposes set forth.

In testimony whereof I have signed my name to this specification in the presence of two subscribing witnesses.

STERLING ELLIOTT.

Witnesses:
BERNICE J. NOYES,
LUCY F. GRAVES.